United States Patent [19]

Schaefers

[11] 4,030,228

[45] June 21, 1977

[54] CARTRIDGE FOR FISHING FLIES AND LEADERS

[76] Inventor: Elvin J. Schaefers, 203 Windsor Court, New Brighton, Minn. 55112

[22] Filed: Jan. 22, 1976

[21] Appl. No.: 651,473

[52] U.S. Cl. .................................... 43/57.5 R
[51] Int. Cl.² ................................... A01K 97/06
[58] Field of Search ...... 43/54.5 R, 54.5 A, 57.5 R, 43/57.5 A

[56] References Cited

UNITED STATES PATENTS

| | | | |
|---|---|---|---|
| 2,625,261 | 1/1953 | Swift | 43/57.5 R |
| 2,638,699 | 5/1953 | Seeburg | 43/57.5 R |
| 2,814,904 | 12/1957 | Reedall | 43/54.5 R |
| 2,936,963 | 5/1960 | Witte | 43/57.5 R |
| 3,039,226 | 6/1962 | Bagdonas | 43/57.5 R |
| 3,927,488 | 12/1975 | Peddy | 43/25 |
| 3,962,815 | 6/1976 | Christensen | 43/54.5 R |

*Primary Examiner*—Warner H. Camp
*Attorney, Agent, or Firm*—Mark W. Gehan

[57] ABSTRACT

A cartridge for separate attachment and storage of a plurality of fishing flies with leaders attached to them, and for winding the leaders separately upon the cartridge, the cartridge including an open area centrally located within the cartridge for the separate attachment and storage of the flies, and a plurality of side-by-side tracks for winding leaders attached to the flies upon the cartridge; means whereby the leaders attached to each of the flies may be brought into position to be wound separately on the side-by-side tracks which form the periphery of the cartridge, each of the leaders being wound separately upon a separate one of the tracks to prevent entanglement of the leaders; means for separately securing the ends of the leaders upon the cartridge after the leaders have been wound thereon; and a case for the cartridge.

1 Claim, 12 Drawing Figures

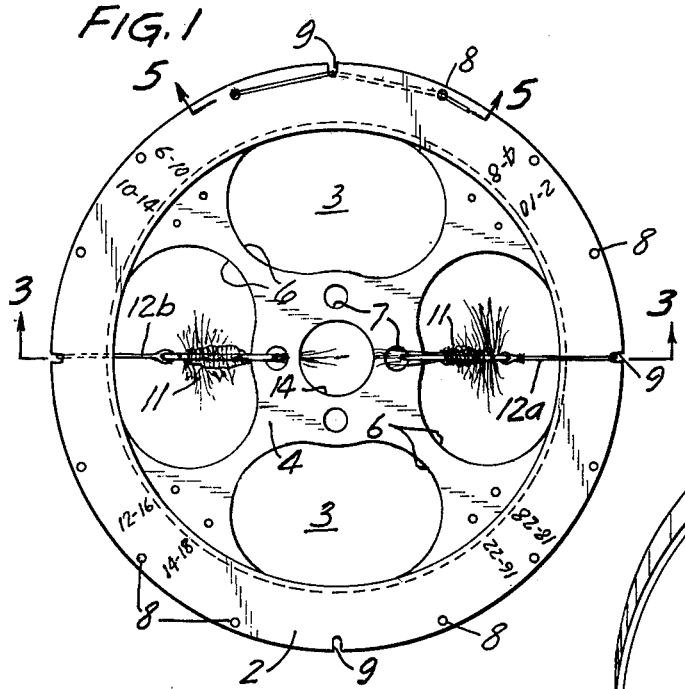
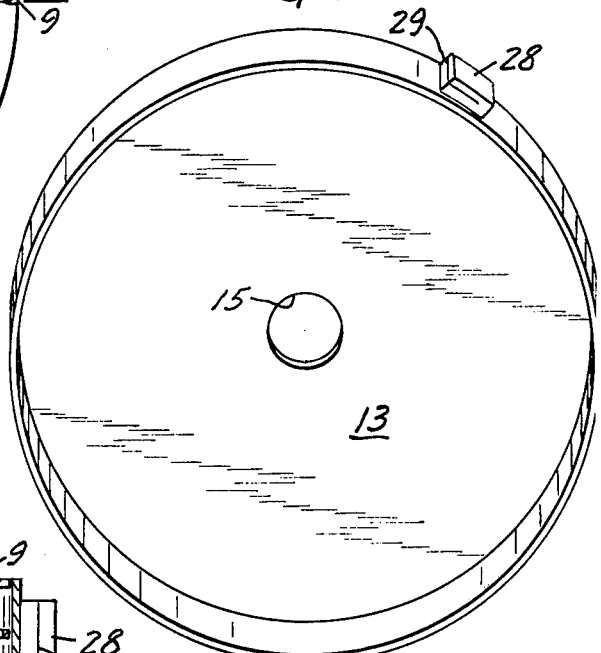
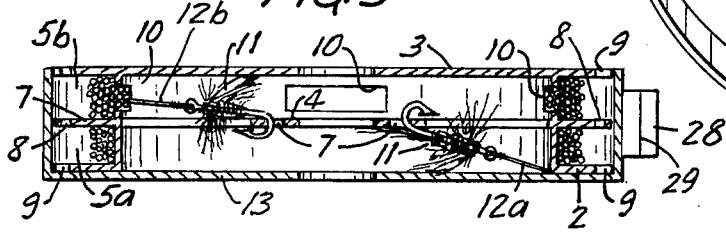
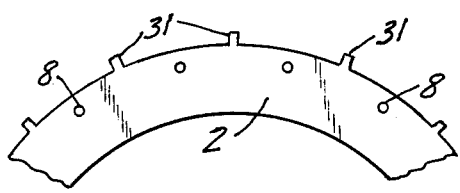
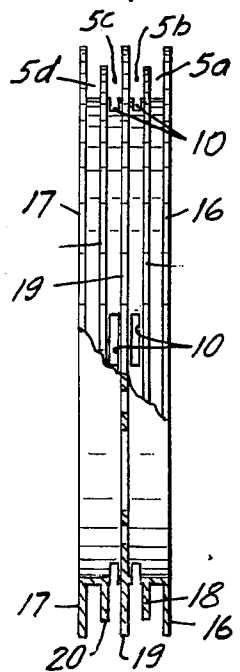
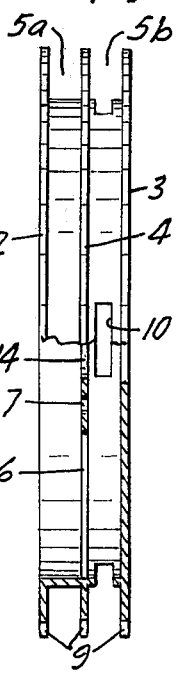

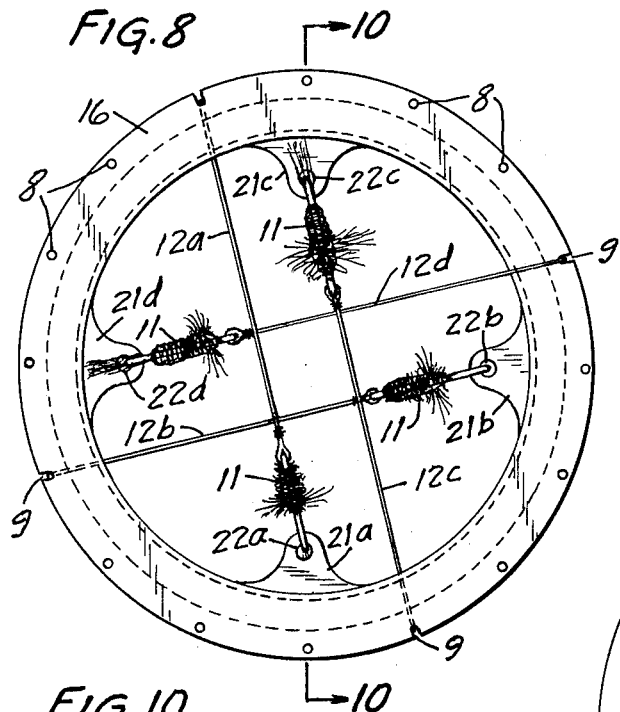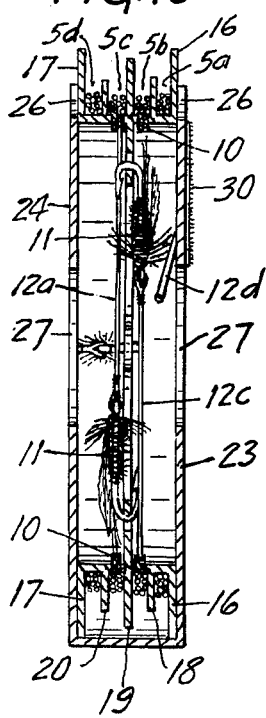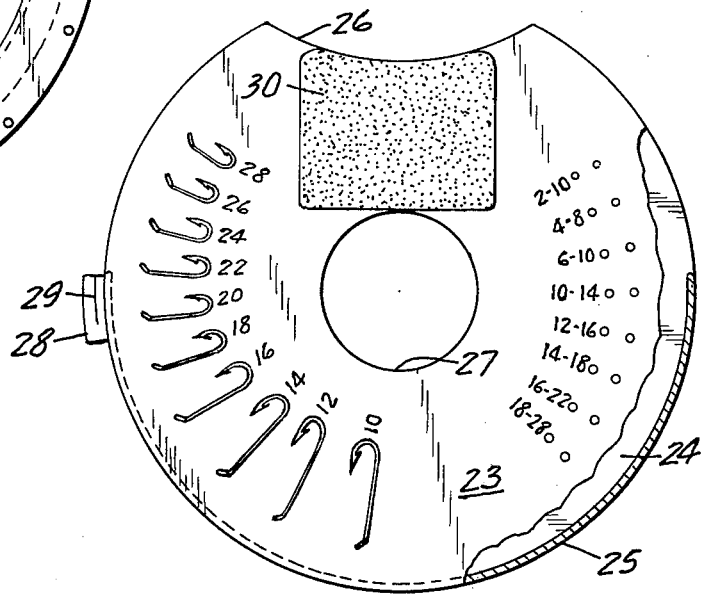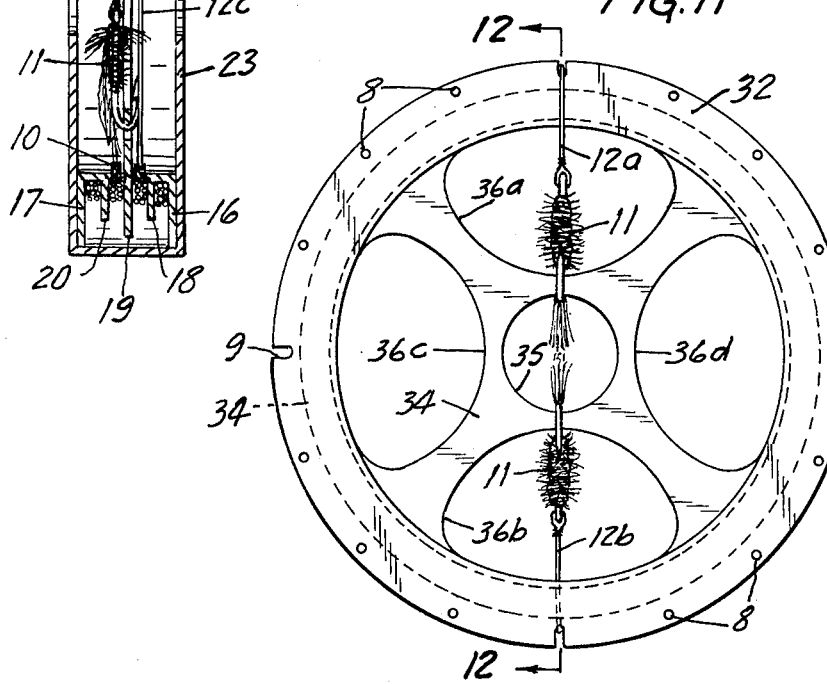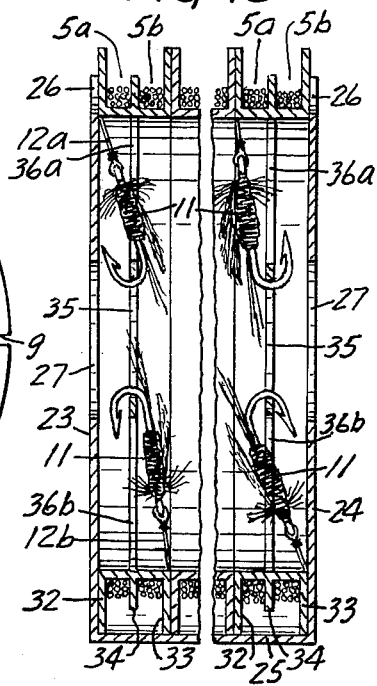

CARTRIDGE FOR FISHING FLIES AND LEADERS

This invention relates to the art of fly fishing, and provides a novel cartridge (with a case therefor) for separate storage and separate winding of a plurality of fishing flies with a leader attached to each of said flies. Serious fly fisherman are quite discriminating in their use of particular leader sizes and varieties of particular sized fishing flies—depending upon the type of fish being sought, and the particular conditions which prevail at the time fishing is being done. For example, a serious fly fisherman will, in picking a particular fly to use, attempt to "match the hatch" of insects which prevail at the time and place he is fishing. In other words, the fisherman will observe the condition of the water in the area he is fishing—and say, in the month of August—and attempt to match the fly which he will use with the kind of insects which appear to be prevalent at the fishing site, at the time.

The serious fly fisherman is also cognizant of the fact that the size of the fly which he will choose may affect the results which he achieves during his fishing expedition. All fly fishing also importantly involves the use of the correct sized and length leader which is attached to a certain sized fly, at one end, and to the fishing line, at its other end. Such leaders are usually from 7½ feet to 12 feet in length. They are tapered so as to diminish in diameter as they approach their end which is attached to the fly. The length of the leader, the degree of taper, and its end diameter necessarily vary with the kind and size of fly being used.

In view of varying conditions which the angler may encounter, at the fishing site, it is his choice either to prepare much of his equipment prior to his visit to the fishing site or to lose time, in preparing such equipment, after he reaches the site. In this connection, if he attaches a particular fly to a suitable leader beforehand, he will encounter a problem in carrying the flies with leaders attached, to the fishing site, in that the flies may be crushed or they may become ensnarled with themselves, or with other flies and leaders which the angler may carry with him.

It is, therefore, an object of this invention to provide a cased cartridge whereby a plurality of fishing flies, with their matched, attached leaders, may be easily stored and classified, according to the fisherman's preference, and transported by him to the fishing site. Also, by use of my invention, the fisherman has easy access to a collection of different leadered flies, wound upon my cartridge, whereby he may, at any time, choose a new fly and leader and quickly attach it to his fishing line. Under present practice, it is necessary for the fisherman to tie the leader, at one end, to the fishing line, and at the other end, to a fly which he might select. That is very difficult with smaller sized fishing flies, or for people with poor eyesight, or under conditions where lighting is not of the best—as is frequently the case, when fishing is good. As a matter of fact, fly tackle stores provide gadgets like fly threaders, clinch knot tyers, eyeglass loupes and a magnification lens-lite combination as aids to the stream-side fisherman, all with the express purpose of aiding in the tying, at streamside, of smaller, frequently used flies. It is a further object of this invention to provide a cartridge wherein a plurality of fishing flies may be stored safe from crushing or other damage, and in which air is permitted to circulate, so that they will readily dry after being used, and thus will not be subject to mildew or other damage.

A further object of the invention is to provide a cartridge wherein a plurality of fishing flies (e.g. flies, streamers, poppers, nymphs, etc.) and their attached leaders may be wound upon a cartridge, in any desired order, and wherein each of them may be removed from the cartridge, in any desired order. In other words, it is not necessary, in use of my invention, to remove the leaders from the cartridge in the same sequence in which they were wound thereon. On the contrary, they may be quickly removed from the cartridge in any desired sequence. Also, it is a further object of my invention to provide a separate track for winding each leader, so that each of such leaders will be secured against entanglement with other leaders wound upon adjacent tracks. Means is provided whereby access to a particular track may be had from the internal storage area, where the flies are attached and stored. It is also a feature of my invention that all of the flies and leaders contained therein are subject to visual identification and thus may be easily selected from one another, when it is desired to remove a particular leader from the cartridge.

Other attempts have been made to aid the fisherman in transporting flies and leaders to the fishing site. Prior art of which I am aware includes the following:

Bagdonas U.S. Pat. NO. 3,039,226 entitled "Fishing Tackle Container;" Scott U.S. Pat. No. 3,464,143 entitled "Snelled Fishhook Receptacle;" Martinson U.S. Pat. No. 2,559,780 entitled "Artificial Lure and Leader Protector And Holder;" Roberts U.S. Pat. No. 2,763,957 entitled "Snelled Hook Container;" and Lampe U.S. Pat. No. 2,553,097 entitled "Leader Holder."

However, none of these prior art attempts has been successful in accomplishing the purposes and objectives of my invention, for reasons which will be apparent from the description of my invention, as hereinafter set forth.

Referring now to the drawings:

FIG. 1 is an enlarged, plan view of one embodiment of my cartridge, with flies attached.

FIG. 2 is a perspective view of a cover for the cartridge shown in FIG. 1.

FIG. 3 is a sectional view, taken along line 3—3 of FIG. 1, but with the cover of FIG. 2 included.

FIG. 4 is a sectional view, taken along line 5—5 of FIG. 1, showing the manner in which the free end of the leader is retained upon the cartridge, to secure against unwinding.

FIG. 5 is a fragmentary, said elevational view, of another embodiment of the rim structure of the cartridge, showing a different means for engaging the leader (functioning as "stop" members to prevent the leader from slipping around the periphery of the cartridge) when the leader is sought to be wound around the track on the cartridge. Said alternate means consisting of stubs extending radially outwardly from the periphery, with leader securing holes being provided.

FIG. 6 is a view, partially in section and partially in side elevation, of the cartridge shown in FIGS. 8 and 10.

FIG. 7 is a view, partially in section and partially in side elevation, of the cartridge shown in FIG. 1, for use in connection with the open-face cover such as is shown in FIG. 2; said cartridge having a continuous backsurface which functions as one side of the assembly when the cover is fitted upon the cartridge.

FIG. 8 is a plan view of another embodiment representing a simplified form of the cartridge shown in FIG. 1, and also being provided with four tracks, as is shown in FIG. 6.

FIG. 9 is a plan view of a sleeve-like form of case with a portion of the topside thereof broken away to show the opposite side of the case and the peripheral edge of the case.

FIG. 10 is a sectional view taken along line 10—10 of FIG. 8, with container of FIG. 9 included.

FIG. 11 is a plan view of a cartridge having modified means for attaching the flies to the cartridge.

FIG. 12 is a sectional view, taken along line 12—12 of FIG. 11, showing the adaptability of my invention to include any number of cartridges within a single container, such as is shown in FIG. 9.

The embodiment shown in FIGS. 1, 3, 7 and 11 are intended to accommodate two flies with attached leaders. For that purpose, they have two side-by-side tracks 5a and 5b extending around the periphery of the cartridge, upon which the two leaders 12a and 12b may be separately wound. The embodiments shown in FIGS. 6, 8 and 10 are adapted to separately accommodate four flies with their attached leaders, or a single leader with several dropper flies attached to it. Those embodiments therefore have four side-by-side tracks 5a, 5b, 5c and 5d around their peripheries, upon which four leaders 12a, 12b, 12 c and 12d may be separately wound. Although the embodiments shown in the drawings are circular in shape, they could equally well be made oval, rectangular or square. The article of my invention may also be made so as to float in water, if so desired.

Referring now to FIGS. 1, 3 and 7 of the drawings, reference characters 2 and 3 designate the opposed, spaced-apart faces of my cartridge. Face 2 is ring-like, with its central portion removed, to form a frontal rim structure for the cartridge and to provide a hollow, central area, internally of the cartridge, where the flies may be separately attached and stored, as shown. This open area provides for the circulation of ambient air around flies stored within the cartridge. Face 3, on the other hand, is a continuous disc-like member. Faces 2 and 3 are separated approximately equidistantly from a divided member 4, by means of spool-forming components, which form side-by-side tracks 5a and 5b. The central portion of divider 4 is provided with a plurality of fly-receiving apertures 6 and a plurality of hook-receiving holes 7.

Face 2, near its rim, and spread substantially equidistantly around the periphery of said cartridge, is provided with a number of leader securing holes 8. Lying intermediate leader securing holes 8 are a number of slots 9, which communicate with the outer edge of face 2, and extend radially inwardly therefrom for a short distance.

Communicating passages 10 are provided so that a leader may be passed from the interior of the cartridge, where said leader's attached fly 11 is mounted to the proper track upon which the leader is to be wound. For example, in FIG. 3, communicating passages 10 extend from the central open portion of the cartridge to track 5b. Thus, leader 12b will be passed through one of communicating passages 10, and then wound on track 5b.

As will be noted from FIG. 1, for example, flies 11 are inserted within the cartridge by placing their barbed ends in hook receiving holes 7 with their hackled shank portions extending radially outwardly and lying in the corresponding fly receiving aperture 6. The attached leader 12, upon each fly 11, is drawn radially outwardly, and in the case of leader 12a is then drawn taut across face 2 and through one of slots 9 (or against stub 31 as shown in FIG. 5). The leader 12a is then wound around track 5a until most of the leader has been wound upon the cartridge: See FIG. 3, particularly. The remaining free end of leader 12a is then drawn through one or more of leader securing holes 8, and is thereby secured against unwinding from the cartridge: See FIG. 4. In the case of leader 12b the barbed portion of fly 11 is inserted through hook-receiving hole 7 with its hackled shank portion extending radially outwardly and lying within the corresponding fly receiving aperture 6. However, the free end of leader 12b, in this instance, is inserted through one of communicating passages 10 so that the free end of said leader may be brought into position to be wound around interior track 5b—without the problem of said leader 12b overlying or interfering with the leader wound upon track 5a. The free tip of leader 12b is secured in one or more of holes corresponding to leader securing holes 8—(not shown), but which are provided near the periphery of face 3 and divider 4.

Cover 13, with a downwardly projecting rim, shown in FIG. 2, is then placed over the cartridge shown in FIG. 1, thereby completely enclosing the flies and leaders wound within said cartridge. Solid face 3 in this embodiment, functions as the closure for the backside of the assembly. Face 3 is provided with a small central opening 14, and cover 13 is provided with a small central opening 15, to premit the air to circulate within the interior of the assembly, where the flies are stored, in order to permit the flies to dry more readily.

Referring to the embodiments shown in FIGS. 6, 8 and 10—front face 16 is substantially identical to front face 2 in the embodiment shown in FIG. 1; that is, it is ring-like, with its central portion removed, to form a frontal rim structure of the cartridge. However, the face forming the rearside of the cartridge here being described, namely, face 17, is also ring-like in formation, as distinguished from the continuous disc-like form of rear face 3, in FIG. 1. In other words, front face 16 and rear face 17 in the embodiments shown in FIGS. 6, 8 and 10 are substantially identical. Each of faces 16 and 17 is provided with leader securing holes 8 and slots 9 spaced in the same manner as the equivalent holes and slots are in FIGS. 1, 3, 7 and 11.

The embodiment here being discussed is intended for the reception and holding of up to four flies and leaders rather than the two flies and leaders which are contemplated for use in the embodiment of FIG. 1. For that reason, additional dividers 18, 19 and 20 are provided. Dividers 18 and 20 are ring-like, and are identical to faces 16 and 17, except that dividers 18 and 20 are somewhat smaller in diameter than faces 16 and 17.

The central divider 19 is of the same diameter as faces 16 and 17. However, the internal circumference of divider 19 is provided with four inwardly projecting protuberances 21a, 21b, 21c and 21d. Each of said protuberances is provided with a hook-receiving hole 22a, 22b, 22c and 22d. The five members 16, 17, 18, 19 and 20 are spaced equidistantly apart, thereby forming side-by-side tracks 5a, 5b, 5c and 5d. A plurality of communicating passages 10 is provided to connect interior tracks 5d and 5c with the interior central portion of the cartridge, where the flies 11 are mounted on protuberances 21a, 21b, 21c and 21d. central divider 19 is also provided with leader securing holes equivalent to holes 8 in FIGS. 1 and 8.

In use of this four-track embodiment of my cartridge, a particular leader may be wound upon any particular track, according to choice. In other words, the leaders 12a, 12b, 12c and 12d may be wound in any desired sequence, upon any one of tracks 5a, 5b, 5c or 5d. In order to wind a leader on track 5a, for example, a fly 11 is attached to one of protuberances 21a, 21b, 21c or 21d by hooking it barbed end through the hook receiving hole in said protuberance. The leader attached to that fly is then stretched taut radially outwardly across face 16 and through one of slots 9. The leader is then wound around track 5a and the free end of that leader is then inserted within one or more of leader securing holes 8 through face 16. Similarly, in order to wind a leader upon track 5d, the same procedure is followed except that the leader is drawn across face 17 (rather than face 16) and then wound upon track 5d, with its free end similarly being inserted within one or more of leader securing holes 8 through face 17.

In order to wind a leader on track 5b, the free end of the leader (the fly on the other end thereof having been attached to an unoccupied one of protuberances 21a, 21b, 21c or 21d) is passed through one of communicating passages 10 leading into track 5b. Said leader is then wound around track 5b, and its free end would then be secured within one or more of leader securing holes 8, located in divider 19. In order to wind a leader upon track 5c, the fly thereon is first attached to another unoccupied one of protuberances 21a, 21b, 21c or 21d, and the free end of the leader is passed through communicating passage 10 (in this instance, said communicating passage leading to track 5c). The leader would be then wound, in identical fashion, around tracks 5c, and its free end would then be inserted through and secured by one or more of leader securing holes 8, again located in divider 19.

FIG. 9 represents a case which is intended, particularly, for use with the cartridge shown in FIGS. 6, 8, 10 and 11. This case is a one-piece case, having opposed sides 23 and 24. Said opposed sides 23 and 24 are maintained in spaced-apart position by a curved edge structure 25, which extends approximately one-half way around the circumference of the opposed sides 23 and 24. The container is thus formed with an opening at its top by means of which the cartridge may be easily placed within the case.

Sides 23 and 24 are provided with indentations 26, which are adapted to fit the thumb and forefinger of the user of the device, so that the cartridge may be easily inserted within, or withdrawn from, the case. Faces 23 and 24 are also provided with central apertures 27, which facilitate the drying of flies stored on the cartridge, by permitting air to circulate within the composite article.

A preferred feature of my invention is a leader straightener 28, which is shown in FIG. 2 and 9. This leader straightener is preferably attached to the cover shown in FIG. 2, or to the case shown in FIG. 9. It comprises a piece of rubber-like material which is provided with a slot 29 through which the leader may be drawn prior to the time it is actually used. The function of this leader straightener is to remove any curl or kink in the leader which may have been caused by reason of the leader's being wound on one of the tracks of the cartridge.

An additional feature which may be incorporated within my device is a piece of "velcro" material 30 affixed to the outer surface of the case, as shown in FIGS. 9 and 10. This piece of "velcro" material may be mated with a corresponding piece of "velcro" material, attached to the user's fishing jacket, or other wearing apparel, whereby the entire case and cartridge may be securely held on the user's person for ready access, when a different leader is needed.

Also, my cartridge would preferably be made in a size which could be readily slipped into the user's pocket, so that it could be carried in that manner.

If desired, various hook sizes may be shown, in reproduction, on a face of the case, as shown in FIG. 9. These hook sizes may then be matched up to the desired size (diameter) of leader which is most suitable for use in connection with a particular hook size. In accomplishing the foregoing, a desired hook size is first selected. Then, in order to determine the proper leader size which should be used with the preferred hook size, an approximately suitably sized (diameter) leader is first selected from a collection of said leaders which the angler has. This temporarily selected leader is then tested, as to its diameter, by inserting it through an appropriate hole which matches the hook size selector. Said holes are of different sizes, to accommodate different sized leaders, and if the fit is snug, the angler will know that the appropriate leader has been chosen for the hook size he plans to use. Alternatively, if the fisherman loses the fly from his leader, while fishing, he will probably want to replace that fly with a fly of the same size. He will select an approximately correctly sized fly from his collection of flies and then test it, for proper size, matching it with the hook sizes shown on the case.

FIG. 12 indicates the manner in which the case of FIG. 9 may be enlarged so as to accommodate more than one cartridge.

Referring to FIG. 5, a different means (equivalent to slots 9) is provided for preventing the leader, which has been drawn taut across face 2, from sliding around the periphery of face 2, when the leader is wound around track 5a. This means comprises stubs 31 which extend radially from the rim of the faces of the cartridge, and thus act as stop members to prevent sliding of the leader when it is being wound on the cartridge.

A further modified form of cartridge is shown in FIG. 11 of the drawings. That embodiment includes a front face 32; a back face 33; and a divider member 34. Front face 32 is substantially identical to front faces 2 and 16 in the embodiments previously described. Back face 33 is substantially identical to front face 32. The central divider 34 has five centrally positioned apertures. These apertures are positioned with one of them forming a central hub-type relationship to the other four apertures, which are spaced around the circumference of the first aperture. Central hole 35 is intended to receive the barbed portion of a fly 11. The four surrounding apertures 36a, 36b, 36c and 36d are adapted to receive the hackled portions of the flies as shown. This structure is used in precisely the same manner as when the two exterior tracks 5a and 5d of the embodiment of FIGS. 8 and 10 are being used. The embodiment shown in FIG. 11, is, of course, only a two-track embodiment.

Those versed in the art will appreciate that the present invention achieves the objects and realizes the advantages hereinbefore mentioned.

Although specific embodiments of the present invention have been illustrated and described herein, it will be understood that the same are merely exemplary of presently preferred embodiments capable of attaining the objects and advantages hereinbefore mentioned, and that the invention is not limited thereto; variations will be readily apparent to those versed in the art.

What I claim is:

1. A cartridge for separate attachment, storage and drying of a plurality of fishing flies, having barbed ends and hackled shank portions, with leaders attached to said hackled shank portions, and for winding said leaders separately upon said cartridge; said cartridge comprising a front face, a back face, a divider member, and spool forming components; said front face and said back face being spaced approximately equidistantly from said divider member by means of said spool forming components, said front face and said back face being provided with a plurality of leader securing holes located adjacent the peripheries of said front face and said back face, said front face and said back face each having its central portion removed to render it ring-like, thus to provide centrally located open areas between each of said faces and said divider member; each of said open areas being of a depth substantially equal to the width of a spool forming component; the central portion of said divider member being provided with at least one hook receiving hole and at least one fly receiving aperture; said fishing flies being storable within said open areas by insertion of their barbed ends through a hook receiving hole with their hackled shank portions suspended within said fly receiving apertures, free from contact with any surface thereby minimizing crushing of said hackled shank portions, permitting free circulation of air around said hackled shank portions to facilitate quick drying thereof after said fishing flies have been used; said open areas providing ready access to said holes and apertures from either face or said cartridge for attachment and removal of said fishing flies, and further providing for the visual identification and selection of fishing flies stored in said cartridge; said spool forming components providing side by side tracks, said side by side tracks being separated by said divider member; means whereby the leaders attached to the hackled shank portions of each of said fishing flies stored within said cartridge may be brought into and maintained in position to be wound separately on said side by side tracks, each of said leaders being wound separately upon a separate one of said side by side tracks to prevent entanglement of said leaders; said leader securing holes providing means whereby the free ends of said leaders may be separately secured in position upon said cartridge after said leaders have been wound thereon; and means for encasing said cartridge.

* * * * *